(12) United States Patent
Okuyama et al.

(10) Patent No.: US 10,940,631 B2
(45) Date of Patent: Mar. 9, 2021

(54) LIQUID BLOW MOLDING METHOD

(71) Applicant: YOSHINO KOGYOSHO CO., LTD., Tokyo (JP)

(72) Inventors: Yuichi Okuyama, Tokyo (JP); Mitsuru Shiokawa, Tokyo (JP); Hiroki Murakami, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 211 days.

(21) Appl. No.: 16/340,632

(22) PCT Filed: Aug. 9, 2017

(86) PCT No.: PCT/JP2017/028987
§ 371 (c)(1),
(2) Date: Apr. 9, 2019

(87) PCT Pub. No.: WO2018/079012
PCT Pub. Date: May 3, 2018

(65) Prior Publication Data
US 2020/0047395 A1    Feb. 13, 2020

(30) Foreign Application Priority Data

Oct. 28, 2016 (JP) .............................. JP2016-211713
Jun. 29, 2017 (JP) .............................. JP2017-127254

(51) Int. Cl.
*B29C 49/46* (2006.01)
*B29C 49/06* (2006.01)
(Continued)

(52) U.S. Cl.
CPC .............. *B29C 49/46* (2013.01); *B29C 49/06* (2013.01); *B29C 49/12* (2013.01); *B29C 49/58* (2013.01);
(Continued)

(58) Field of Classification Search
CPC .... B29C 2049/4664; B29C 2049/5803; B29C 49/06; B29C 49/12; B29C 49/46;
(Continued)

(56) References Cited

U.S. PATENT DOCUMENTS

2016/0052189 A1    2/2016  Winzinger
2020/0156302 A1*   5/2020  Hoshino ................. B29C 49/58
(Continued)

FOREIGN PATENT DOCUMENTS

EP      2 987 619 A1    2/2016
JP      2013-208834 A   10/2013
(Continued)

OTHER PUBLICATIONS

Jul. 27, 2020 Office Action issued in Chinese Patent Application No. 201780063546.3.
(Continued)

*Primary Examiner* — Robert J Grun
(74) *Attorney, Agent, or Firm* — Oliff PLC

(57) ABSTRACT

A liquid blow molding method of molding a preform into a liquid-containing container includes: a first nozzle descending step of descending a blow nozzle to a first position at which the blow nozzle does not seal the mouth part; a gas-liquid replacement step of supplying a liquid into the preform from the blow nozzle at the first position and discharging air inside the preform to outside; a second nozzle descending step of descending the blow nozzle to a second position at which the blow nozzle seals the mouth part, after the gas-liquid replacement step; and a blow molding step of supplying the liquid into the preform from the blow nozzle at the second position to blow mold the preform into the predetermined shape.

7 Claims, 12 Drawing Sheets

(51) Int. Cl.
*B29C 49/12* (2006.01)
*B29C 49/58* (2006.01)

(52) U.S. Cl.
CPC ............... *B29C 2049/4664* (2013.01); *B29C 2049/5803* (2013.01)

(58) Field of Classification Search
CPC ............... B29C 49/58; B29K 2023/12; B29K 2067/003; B29L 2031/7158
See application file for complete search history.

(56) References Cited

U.S. PATENT DOCUMENTS

| | | | |
|---|---|---|---|
| 2020/0331186 A1* | 10/2020 | Shiokawa | B29C 49/4252 |
| 2020/0346390 A1* | 11/2020 | Okuyama | B29C 49/12 |
| 2020/0361133 A1* | 11/2020 | Okuyama | B29C 49/06 |

FOREIGN PATENT DOCUMENTS

| | | | |
|---|---|---|---|
| WO | 2016/147531 A1 | 9/2016 | |
| WO | 2016/174846 A1 | 11/2016 | |

OTHER PUBLICATIONS

Sep. 12, 2017 International Search Report issued in International Patent Application No. PCT/JP2017/028987.
May 11, 2020 Extended Search Report issued in European Patent Application No. 17863901.9.

* cited by examiner

LIQUID BLOW MOLDING METHOD

TECHNICAL FIELD

The present disclosure relates to a liquid blow molding method of molding a bottomed cylindrical preform having a mouth part into a liquid-containing container of a predetermined shape.

BACKGROUND

Synthetic resin-made containers such as bottles made of polypropylene (PP) and bottles made of polyethylene terephthalate (PET) are used to contain, as content liquids, various liquids including beverages, cosmetics, medicines, detergents, and toiletries such as shampoos. Such a container is typically manufactured by blow molding a bottomed cylindrical preform made of a thermoplastic synthetic resin material such as the above-mentioned materials and having a mouth part.

As a blow molding method of molding a preform into a container, liquid blow molding using a pressurized liquid as a pressurized medium supplied into a preform is known.

For example, JP 2013-208834 A (PTL 1) describes a liquid blow molding method whereby a preform preheated to a temperature at which stretchability is developed is set in a mold for blow molding, a blow nozzle is descended to a position at which the blow nozzle seals the mouth part of the preform, and a liquid is supplied into the preform through the blow nozzle at a predetermined pressure to mold the preform into a container of a predetermined shape along the cavity of the mold. With such a liquid blow molding method, the content liquid to be contained in the container as a product, such as a beverage, can be used as the liquid supplied into the preform to simultaneously mold the container and fill the container with the content liquid, so that the liquid-containing container containing the content liquid can be molded easily. This eliminates the need for a step of filling the molded container with the content liquid, and simplifies the production process and the structure of the production line (device).

CITATION LIST

Patent Literature

PTL 1: JP 2013-208834 A

SUMMARY

Technical Problem

With the conventional liquid blow molding method described above, the liquid supplied from the blow nozzle into the preform fills the preform while entrapping air present inside the preform, as a result of which the air is entrapped in the liquid contained in the molded container. Particularly in the case where the viscosity of the liquid is a predetermined level or more, the air entrapped in the liquid is retained in the liquid. This causes problems such as bubbling at the liquid surface, poor appearance caused by air bubbles in the liquid, and a failure to fill the container with a prescribed amount of the liquid because of a decrease in the apparent specific gravity of the liquid.

It could therefore be helpful to provide a liquid blow molding method that can suppress air entrapment into a liquid in blow molding.

Solution to Problem

A liquid blow molding method according to the present disclosure is a liquid blow molding method of molding a bottomed cylindrical preform having a mouth part into a liquid-containing container of a predetermined shape, the liquid blow molding method comprising: a first nozzle descending step of descending a blow nozzle to a first position at which the blow nozzle does not seal the mouth part; a gas-liquid replacement step of supplying a liquid into the preform from the blow nozzle at the first position and discharging air inside the preform to outside through a gap between the mouth part and the blow nozzle; a second nozzle descending step of descending the blow nozzle to a second position at which the blow nozzle seals the mouth part, after the gas-liquid replacement step; and a blow molding step of supplying the liquid into the preform from the blow nozzle at the second position to blow mold the preform into the predetermined shape.

Preferably, in the liquid blow molding method according to the present disclosure, at least one of a pressure and a flow rate of the liquid supplied into the preform is lower in the gas-liquid replacement step than in the blow molding step.

Preferably, in the liquid blow molding method according to the present disclosure, the preform has a diameter expansion part, on an inner circumferential surface of the mouth part, extending from an open end of the mouth part in an axial direction and having a larger diameter than an outer diameter of the blow nozzle, and a step surface extending radially inward from a lower end of the diameter expansion part, the first position is a position at which a lower end of the blow nozzle has a gap in the axial direction with the step surface, and the second position is a position at which the lower end of the blow nozzle abuts on the step surface over a whole circumference.

Preferably, the liquid blow molding method according to the present disclosure comprises a rod insertion step of inserting a rod member into the preform, before the gas-liquid replacement step, wherein the gas-liquid replacement step is performed on the preform having the rod member inserted therein as a result of the rod insertion step.

Preferably, in the liquid blow molding method according to the present disclosure, in the rod insertion step, the rod member is inserted to a position at which the rod member occupies 30% to 70% of a capacity of the preform.

Preferably, in the liquid blow molding method according to the present disclosure, the rod member is a stretching rod for stretching the preform in an axial direction.

Preferably, in the liquid blow molding method according to the present disclosure, an opening of a seal body that opens and closes the blow nozzle is adjusted so that an effective cross-sectional area of the blow nozzle when supplying the liquid into the preform in the gas-liquid replacement step is not more than 10% of an effective cross-sectional area of the blow nozzle when supplying the liquid into the preform in the blow molding step.

Advantageous Effect

It is thus possible to provide a liquid blow molding method that can suppress air entrapment into a liquid in blow molding.

DETAILED DESCRIPTION

More detailed description will be given below with reference to drawings.

A liquid blow molding method according to the present disclosure is a liquid blow molding method of molding a bottomed cylindrical preform having a mouth part into a liquid-containing container of a predetermined shape, the liquid blow molding method comprising: a first nozzle descending step of descending a blow nozzle to a first position at which the blow nozzle does not seal the mouth part; a gas-liquid replacement step of supplying a liquid into the preform from the blow nozzle at the first position and discharging air inside the preform to outside through a gap between the mouth part and the blow nozzle; a second nozzle descending step of descending the blow nozzle to a second position at which the blow nozzle seals the mouth part, after the gas-liquid replacement step; and a blow molding step of supplying the liquid into the preform from the blow nozzle at the second position to blow mold the preform into the predetermined shape.

The liquid blow molding method according to the present disclosure is suitable in the case of molding a liquid-containing container containing, as a content liquid, a liquid with relatively high viscosity such as a shampoo, a hair conditioner, or a liquid soap, but can be used in the case of molding a liquid-containing container containing any of various liquids as a content liquid regardless of viscosity, such as a liquid-containing container containing, as a content liquid, a liquid with relatively low viscosity such as water or a beverage.

Figure 1:
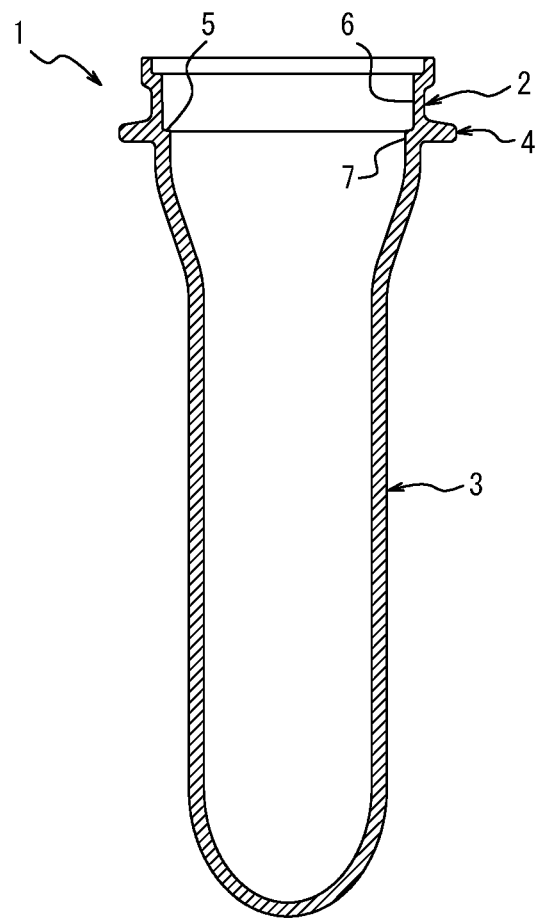
FIG. 1 is a sectional diagram of a preform used in a liquid blow molding method according to one of the disclosed embodiments.
Figure 2:
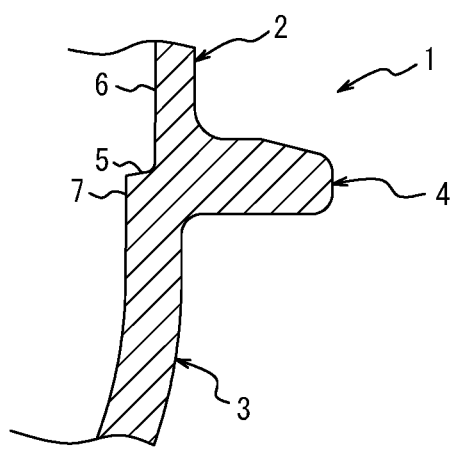
FIG. 2 is an enlarged sectional diagram illustrating main parts of the preform illustrated in FIG. 1.
Figure 3:
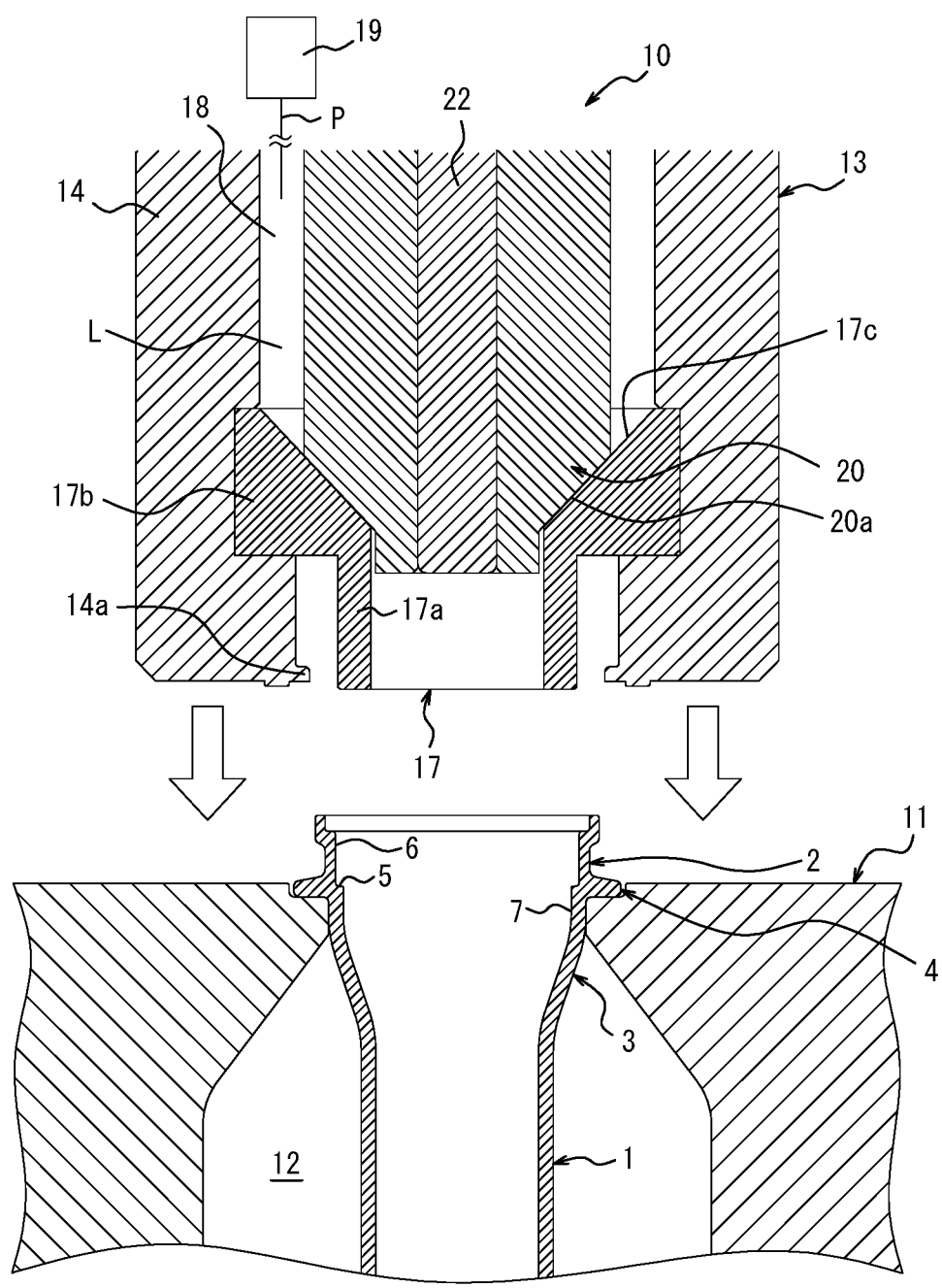
FIG. 3 is an explanatory diagram illustrating a liquid blow molding device used in the liquid blow molding method according to one of the disclosed embodiments.

The liquid blow molding method according to the present disclosure can be carried out using, for example, a preform 1 having the shape illustrated in FIGS. 1 and 2 and a liquid blow molding device 10 having the structure illustrated in FIG. 3.

The preform 1 is liquid blow molded into a liquid-containing container C of a predetermined shape (see FIG. 10) by the liquid blow molding device 10. For example, a resin material that develops stretchability as a result of heating, such as polypropylene (PP), polyethylene terephthalate (PET), or polyethylene (PE), is molded using means such as injection molding, compression molding, or extrusion molding to form the bottomed cylindrical preform 1 including a mouth part 2, a body part 3, and a neck support part 4.

Although the preform 1 has a single-layer structure made only of one type of resin material, the preform 1 may have a laminate structure in which an outer layer and an inner layer made of different materials or the same material are stacked. In the laminate structure, the inner layer may be provided on the inner side of the outer layer so as to be peelable. The preform 1 may have a laminate structure of three or more layers.

The mouth part 2 is a part not stretched by blow molding, and is approximately cylinder-shaped. The body part 3 is a part stretched by blow molding, and is shaped like a test tube coaxial with the mouth part 2 and integrally connected to the lower end of the mouth part 2. The neck support part 4 is located between the mouth part 2 and the body part 3. The neck support part 4 is flange-shaped, and projects radially outward from the outer circumferential surface of the mouth part 2. The neck support part 4 has an annular shape extending in the circumferential direction of the preform 1 over the whole circumference.

A step surface 5 is provided on the inner circumferential surface of the preform 1. The step surface 5 is a flat surface approximately perpendicular to the axial direction of the mouth part 2, i.e. a flat surface that is slightly inclined to be gradually away from the open end of the mouth part 2 from the radial (radial direction) outer side toward the radial inner side with respect to a surface perpendicular to the axial direction of the mouth part 2. The step surface 5 is annularly shaped to extend over the whole circumference of the inner circumferential surface of the preform 1. When blow molding the preform 1 by the liquid blow molding device 10, the step surface 5 functions as a seal surface on which a nozzle body 17*a* of a blow nozzle 17 abuts in the axial direction (see FIG. 8). Forming the step surface 5 as a flat surface approximately perpendicular to the axial direction of the mouth part 2 ensures that the nozzle body 17*a* of the blow nozzle 17 abuts on the step surface 5.

Although the step surface 5 is a flat surface that is slightly inclined to be gradually away from the open end of the mouth part 2 from the radial outer side toward the radial inner side with respect to a surface perpendicular to the axial direction of the mouth part 2 in this embodiment, the step surface 5 is not limited to such. For example, the step surface 5 may be a flat surface exactly perpendicular to the axial direction of the mouth part 2 or a curved surface, as long as the mouth part 2 can be sealed as a result of the nozzle body 17a of the blow nozzle 17 abutting on the step surface 5.

A diameter expansion part 6 extends from the step surface 5 of the preform 1 toward the open end of the mouth part 2, as illustrated in FIG. 2. The inner diameter of the diameter expansion part 6 is larger than the inner diameter of an inner circumferential surface 7 extending from the step surface 5 of the preform 1 toward the body part 3 side. Thus, the inner diameter of the inner circumferential surface of the preform 1 expands stepwise from the body part 3 side toward the mouth part 2 side, and the step surface 5 is the part at which the inner diameter of the inner circumferential surface expands. The inner diameter of the diameter expansion part 6 is larger than the outer diameter of the nozzle body 17a of the blow nozzle 17.

The structure of the liquid blow molding device 10 will be described below.

The liquid blow molding device 10 includes a mold 11 for blow molding, as illustrated in FIG. 3. The mold 11 has a cavity 12 (only part of the upper part is illustrated in FIG. 3) that has a bottle shape corresponding to the molded liquid-containing container C and is open upward at the upper surface of the mold 11. The mold 11 is openable right and left, and the molded liquid-containing container C can be taken out of the mold 11 by opening the mold 11, although not illustrated in detail.

The preform 1 can be placed in the mold 11. FIG. 3 illustrates a state in which the preform 1 is placed in the mold 11. The preform 1 is placed in the mold 11 in a standing position with the mouth part 2 being on the upper side, and the mouth part 2 projects upward from the cavity 12 in the placement state.

A nozzle unit 13 is provided above the mold 11. The nozzle unit 13 includes a main block 14 to which a blow nozzle 17 is attached. The nozzle unit 13 is movable in the vertical direction relative to the mold 11, i.e. capable of ascending and descending, under control of a control device (not illustrated).

The blow nozzle 17 includes a cylindrical nozzle body 17a smaller in diameter than the diameter expansion part 6, and a large-diameter sandwiched part 17b formed integrally with the nozzle body 17a. The blow nozzle 17 may be made of, for example, a steel material or a resin material, and is fixed to the main block 14 as a result of the sandwiched part 17b being sandwiched by the inner surface of the main block 14. A hook part 14a for holding the neck support part 4 with the upper surface of the mold 11 in a sandwiched manner is provided at the lower end of the main block 14.

The nozzle body 17a is coaxial with the cavity 12 of the mold 11, and is movable in the vertical direction relative to the mold 11, i.e. capable of ascending and descending, together with the nozzle unit 13. When the nozzle body 17a descends to a first position, the part of the nozzle body 17a at the lower end is inserted into the mouth part 2 of the preform 1 placed in the mold 11. Here, the lower end of the nozzle body 17a is above and apart from the step surface 5, and thus there is a gap between the lower end of the nozzle body 17a and the step surface 5 in the axial direction. Moreover, since the outer diameter of the nozzle body 17a is smaller than the inner diameter of the diameter expansion part 6 of the preform 1, there is a gap between the outer circumferential surface of the nozzle body 17a and the inner circumferential surface of the diameter expansion part 6.

That is, in a state in which the nozzle body 17a has been descended to the first position, the inside of the preform 1 communicates with the outside of the preform 1 through the gap between the mouth part 2 and the blow nozzle 17. Thus, descending the nozzle body 17a to the first position can create a state in which the inside of the preform 1 communicates with the outside of the preform 1 while the nozzle body 17a is inserted in the mouth part 2 (see FIG. 5).

When the nozzle body 17a descends to a second position lower than the first position together with the nozzle unit 13, the lower end of the nozzle body 17a abuts on the step surface 5 in the axial direction with a predetermined pressure. The mouth part 2 of the preform 1 is therefore sealed liquid-tight from the outside of the preform 1 by the blow nozzle 17. Thus, descending the nozzle body 17a to the second position can seal the mouth part 2 from the outside of the preform 1 (see FIG. 8).

A supply path 18 extending in the vertical direction is formed inside the main block 14. The lower end of the supply path 18 is connected to the blow nozzle 17. The supply path 18 is also connected to a pressurized liquid supply part 19 through a piping P. The pressurized liquid supply part 19 can supply a liquid L to the blow nozzle 17 through the piping P and the supply path 18 at a predetermined pressure or flow rate.

As the pressurized liquid supply part 19, for example, a plunger pump is preferably used as a pressurization source. However, the pressurized liquid supply part 19 may have any other structure as long as it can supply the liquid L to the blow nozzle 17 at a predetermined pressure or flow rate.

A seal body 20 for opening and closing the blow nozzle 17 is provided in the supply path 18. The seal body 20 has a cylindrical bar shape extending along the axis of the supply path 18, and is movable in the vertical direction in the supply path 18. The upper surface of the sandwiched part 17b of the blow nozzle 17 is a tapered closed surface 17c. When the seal body 20 moves to the lower stroke end and a tapered surface 20a at the tip of the seal body 20 abuts on the closed surface 17c, the communication between the supply path 18 and the nozzle body 17a is blocked by the seal body 20 to close the blow nozzle 17.

A stretching rod 22 is slidably placed on the inner side of the seal body 20. The stretching rod 22 is movable in the vertical direction (axial direction) relative to the seal body 20. By moving the stretching rod 22 downward relative to the seal body 20, the body part 3 of the preform 1 placed in the mold 11 can be stretched in the vertical direction (axial direction) in the cavity 12. Hence, the liquid blow molding device 10 can perform biaxial stretching blow molding on the preform 1 by stretching the preform 1 in the vertical direction using the stretching rod 22 before or while supplying the pressurized liquid L into the preform 1.

The stretching rod 22 may be omitted from the liquid blow molding device 10.

A method (liquid blow molding method according to the present disclosure) of molding the preform 1 into the liquid-containing container C of the predetermined shape using the liquid blow molding device 10 having such a structure will be described below.

First, the preform 1 preheated to such a predetermined temperature (e.g. 80° C. to 150° C.) at which stretchability is developed using a heating means such as a heater (not illustrated) is placed in the mold 11, and the mold is clamped to be in the state illustrated in FIG. 3.

Figure 4:
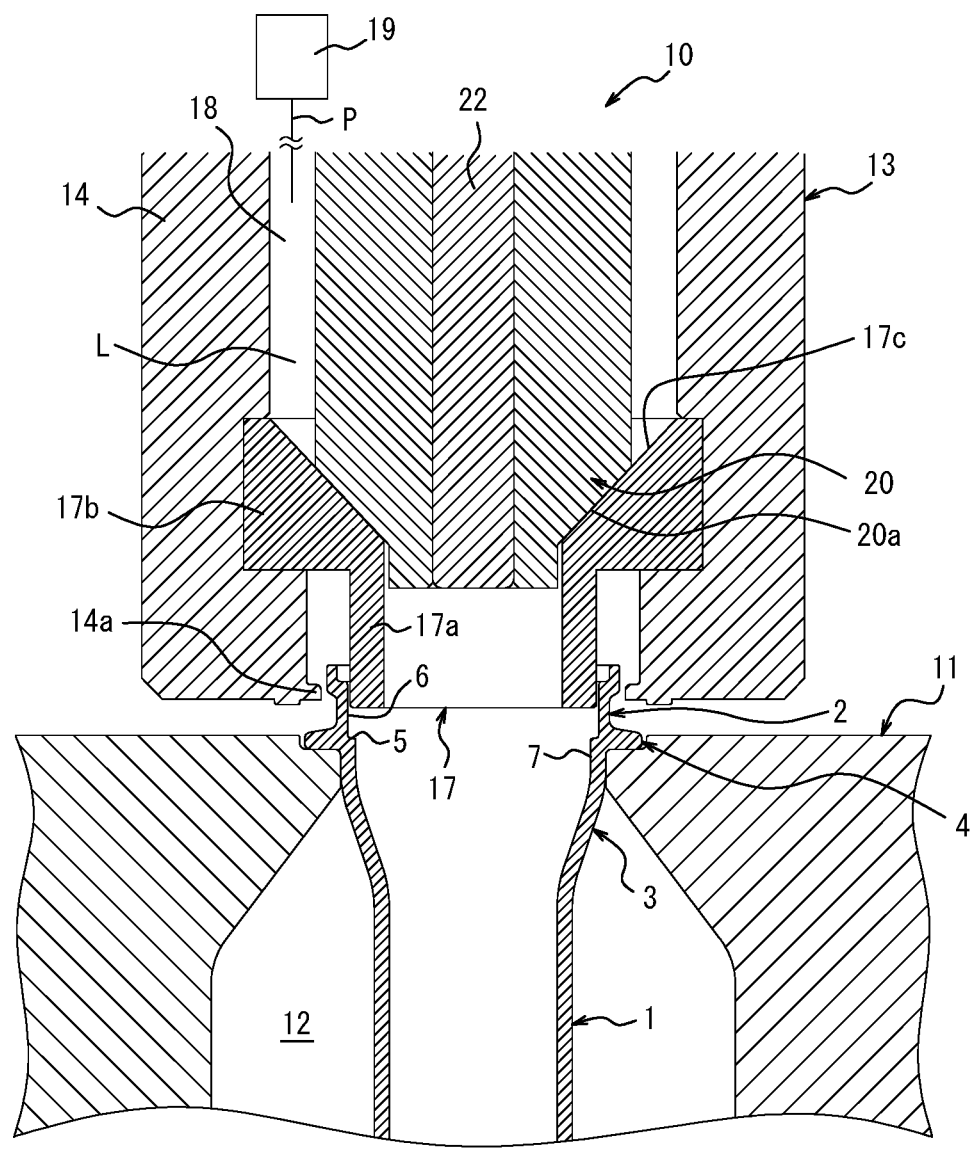
FIG. 4 is an explanatory diagram illustrating the liquid blow molding device in a state in which a blow nozzle has been descended to a first position as a result of a first nozzle descending step.
Figure 5:
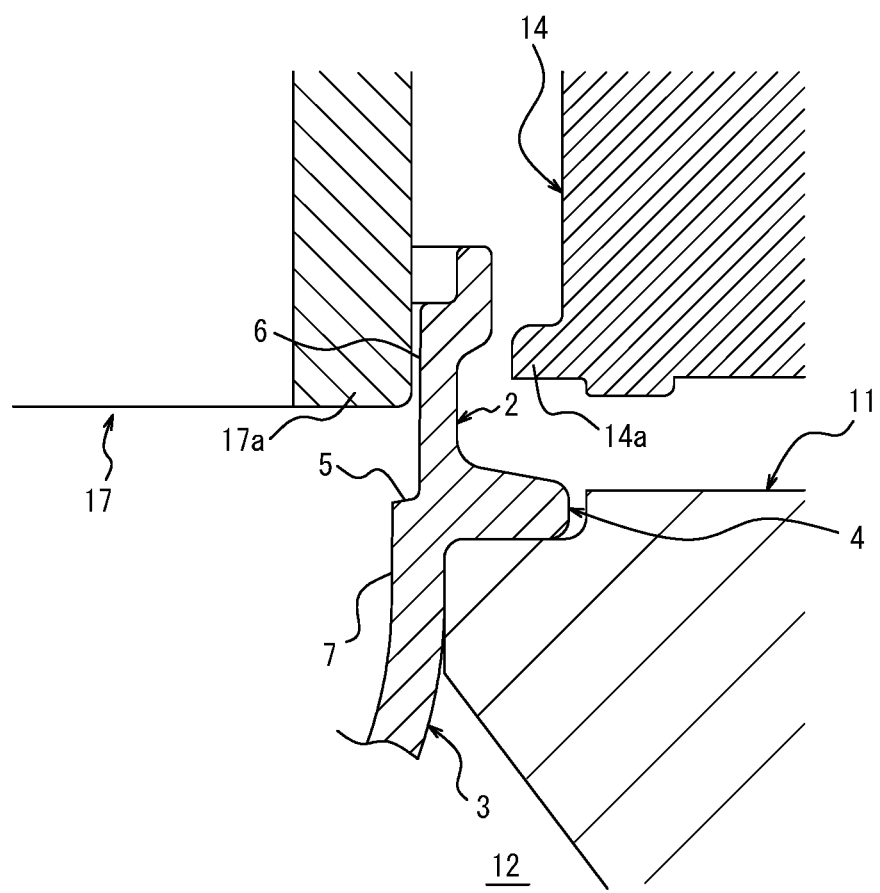
FIG. 5 is an enlarged sectional diagram illustrating the positional relationship between the blow nozzle at the first position and the mouth part of the preform.

A first nozzle descending step is then performed. In the first nozzle descending step, the nozzle unit 13, i.e. the blow nozzle 17, is descended to the first position at which the blow nozzle 17 does not seal the mouth part 2 of the preform 1, as illustrated in FIG. 4. When the blow nozzle 17 descends to the first position, the nozzle body 17a of the blow nozzle 17 is inserted into the mouth part 2 of the preform 1, but there is a gap between the lower end of the nozzle body 17a and the step surface 5 in the axial direction as illustrated in FIG. 5. Moreover, since the outer diameter of the nozzle body 17a is smaller than the inner diameter of the diameter expansion part 6, there is a gap between the outer circumferential surface of the nozzle body 17a and the inner circumferential surface of the diameter expansion part 6. Accordingly, in a state in which the blow nozzle 17 has been descended to the first position, the inside of the preform 1 communicates with the outside of the preform 1 through the gap between the mouth part 2 and the nozzle body 17a.

Figure 6:
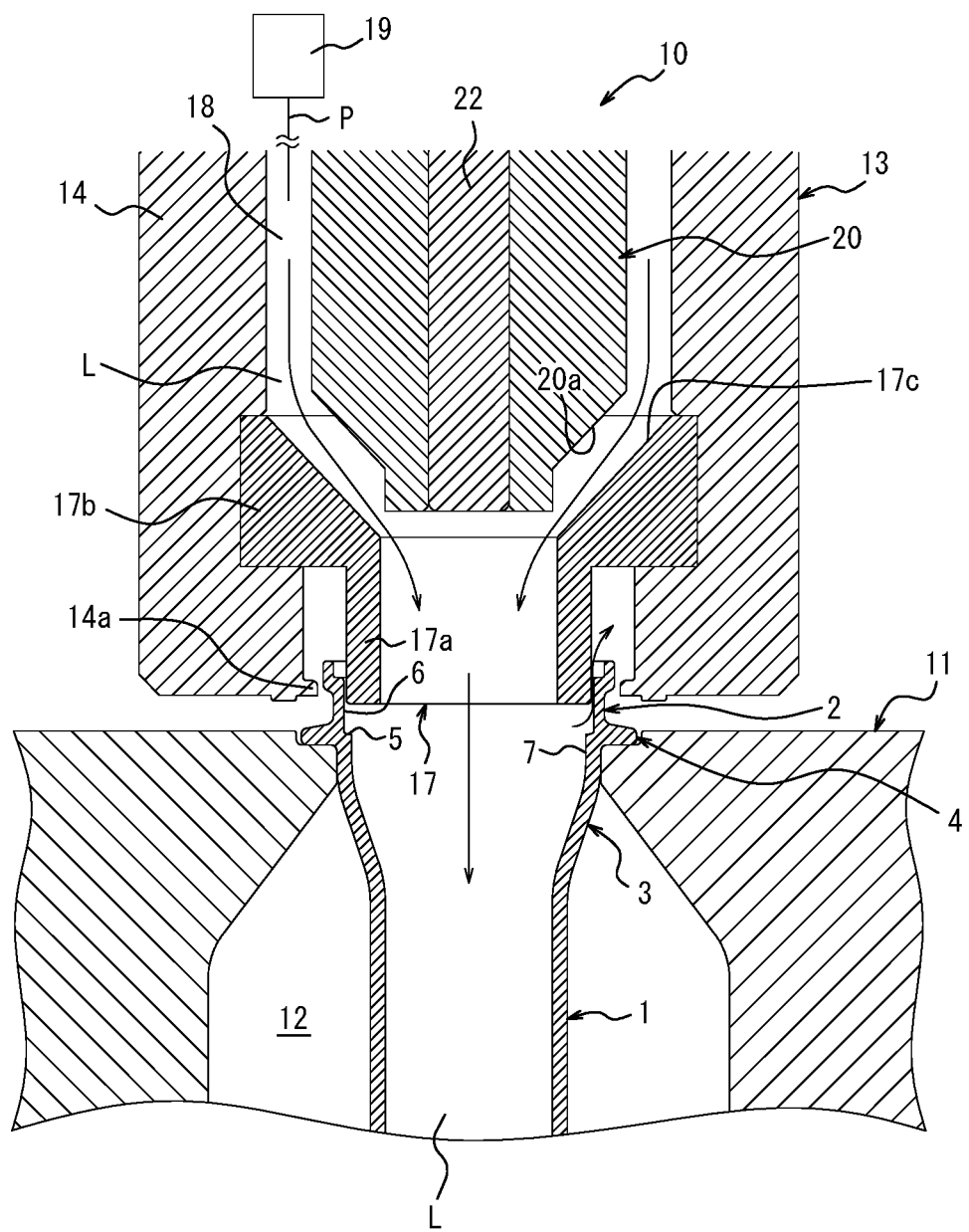
FIG. 6 is an explanatory diagram illustrating the liquid blow molding device in a state in which a gas-liquid replacement step is performed.

A gas-liquid replacement step is then performed. In the gas-liquid replacement step, the pressurized liquid supply part 19 is operated and also the seal body 20 is moved upward to open the blow nozzle 17, to supply the liquid L from the blow nozzle 17 at the first position into the preform 1 at a predetermined pressure or flow rate, as illustrated in FIG. 6. Here, the inside of the preform 1 communicates with the outside of the preform 1 through the gap between the mouth part 2 and the nozzle body 17a. Accordingly, when the liquid L is supplied, the air inside the preform 1 is discharged to the outside of the preform 1 through the gap between the mouth part 2 and the nozzle body 17a. Thus, in the gas-liquid replacement step, the air inside the preform 1 is replaced with the liquid L, as a result of which the inside of the preform 1 can be filled with the liquid L instead of air.

In the gas-liquid replacement step, the liquid L is preferably supplied into the preform 1 at such a low pressure and/or low flow rate that does not cause the liquid L supplied from the nozzle body 17a into the preform 1 to entrap the air inside the preform 1. In this way, even in the case where the liquid L is a liquid with relatively high viscosity such as a shampoo, a hair conditioner, or a liquid soap, the air inside the preform 1 can be replaced with the liquid L without air entrapment into the liquid L. The pressure and/or flow rate of the liquid L supplied into the preform 1 in the gas-liquid replacement step is such a pressure and/or flow rate that does not cause blow molding of the preform 1 by the liquid L. The amount of the liquid L supplied into the preform 1 is preferably such an amount that fills the whole part on the body part 3 side of the step surface 5 of the preform 1 with the liquid L, but may be less than this amount, or such an amount that fills the whole preform 1.

In this embodiment, the lower end of the nozzle body 17a of the blow nozzle 17 is located lower than the open end of the mouth part 2 of the preform 1, in the first position. This ensures that the liquid L discharged from the nozzle body 17a is supplied into the preform 1 without leaking out of the mouth part 2 in the gas-liquid replacement step.

In the gas-liquid replacement step, it is preferable to adjust the opening of the seal body 20 that opens and closes the blow nozzle 17 so that the effective cross-sectional area (the cross-sectional area of the annular flow path through which the liquid L flows) of the blow nozzle 17 when supplying the liquid L into the preform 1 in the gas-liquid replacement step is not more than 10% of the effective cross-sectional area of the blow nozzle 17 when supplying the liquid L into the preform 1 in the below-described blow molding step.

This prevents the air inside the preform 1 from flowing backward into the supply path 18 through the blow nozzle 17, when supplying the liquid L into the preform 1 through the blow nozzle 17 in the gas-liquid replacement step. Consequently, in the subsequent blow molding step, the preform 1 can be molded into the liquid-containing container C more accurately by preventing supply of the liquid L containing air into the preform 1.

Figure 7:
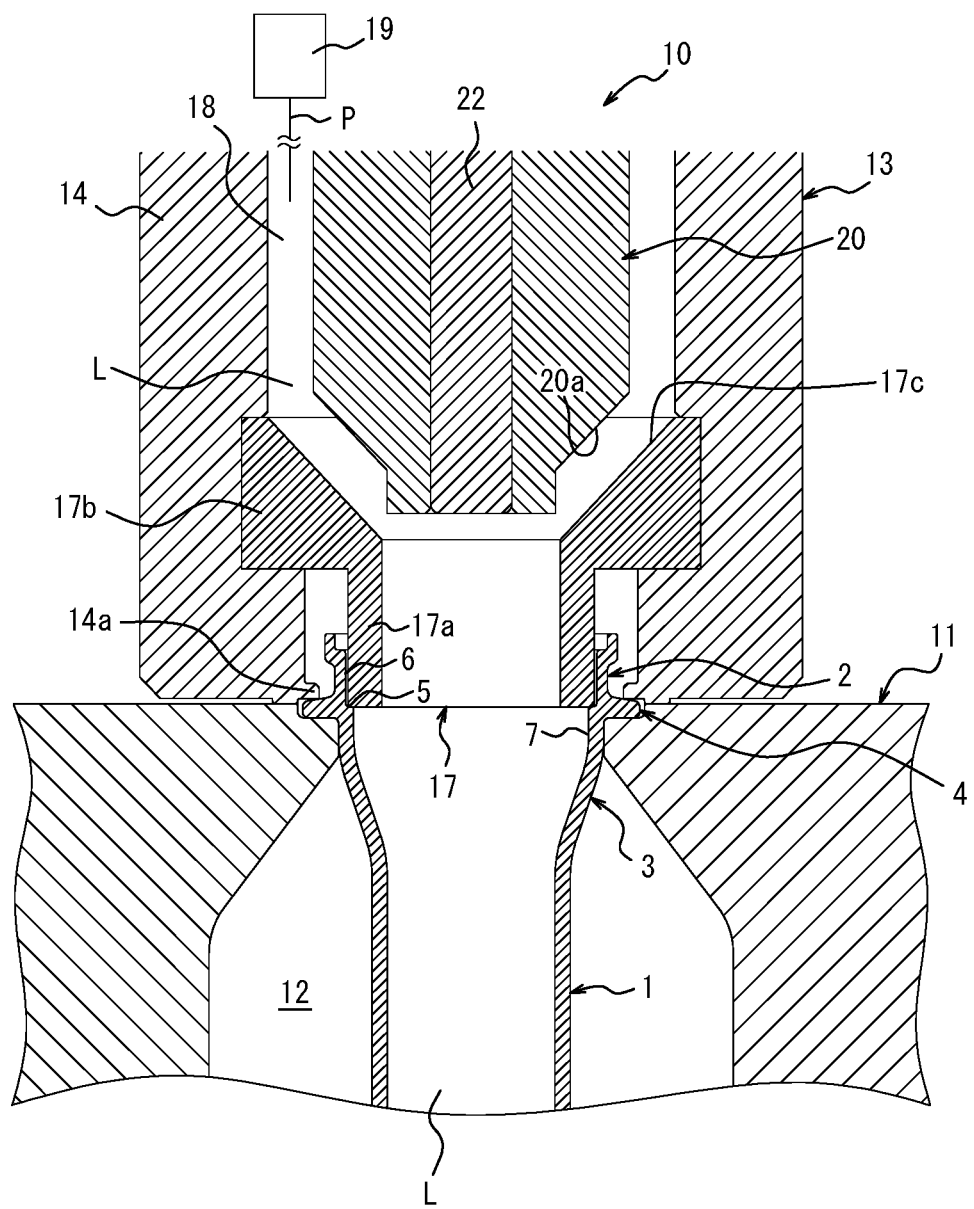
FIG. 7 is an explanatory diagram illustrating the liquid blow molding device in a state in which the blow nozzle has been descended to a second position as a result of a second nozzle descending step.

After the gas-liquid replacement step ends, a second nozzle descending step is performed with the seal body 20 open, as illustrated in FIG. 7. Here, the pressurized liquid supply part 19 may be continuously in operation, or may be stopped temporarily. After the gas-liquid replacement step, the second nozzle descending step may be performed after temporarily closing the seal body 20.

Figure 8:
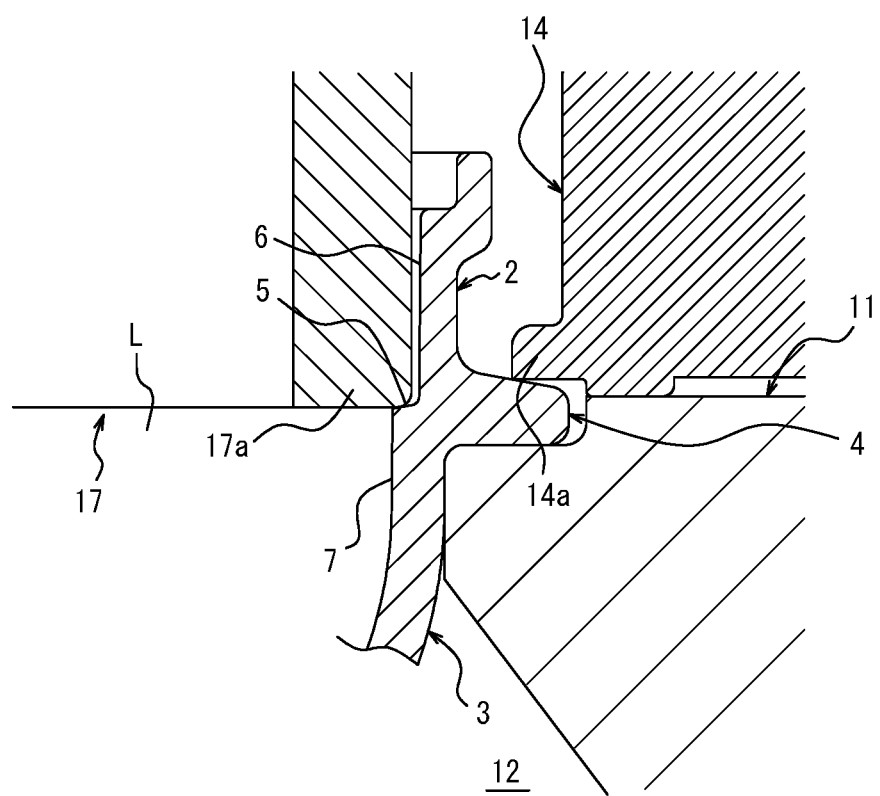
FIG. 8 is an enlarged sectional diagram illustrating the positional relationship between the blow nozzle at the second position and the mouth part of the preform.

In the second nozzle descending step, the nozzle unit 13, i.e. the blow nozzle 17, is descended to the second position at which the blow nozzle 17 seals the mouth part 2 of the preform 1. The second position is lower than the first position. When the blow nozzle 17 descends to the second position, the lower end of the nozzle body 17a abuts on the step surface 5 over the whole circumference in the axial direction with a predetermined pressure, as illustrated in FIG. 8. The mouth part 2 of the preform 1 is therefore sealed liquid-tight from the outside of the preform 1 by the blow nozzle 17.

Figure 9:
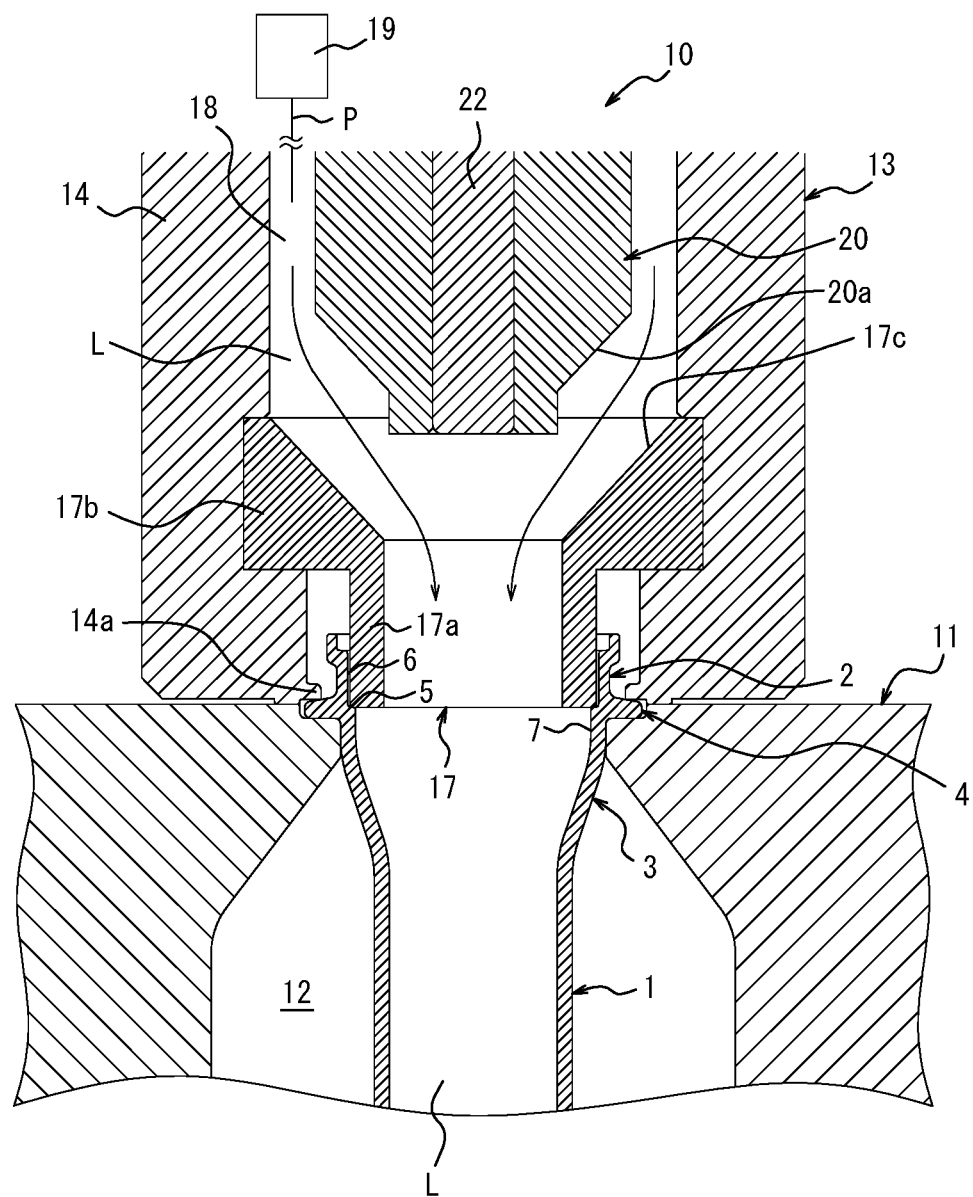
FIG. 9 is an explanatory diagram illustrating the liquid blow molding device in a state in which a blow molding step is performed.

After the second nozzle descending step ends, the blow molding step is performed. In the blow molding step, the pressurized liquid supply part 19 is operated to supply the liquid L from the nozzle body 17a of the blow nozzle 17 at the second position into the preform 1 at a predetermined pressure or flow rate, as illustrated in FIG. 9. In the case where, after the gas-liquid replacement step, the second nozzle descending step is performed after temporarily closing the seal body 20, the pressurized liquid supply part 19 is operated and also the seal body 20 is opened to supply the liquid L from the nozzle body 17a of the blow nozzle 17 at the second position into the preform 1 at the predetermined pressure or flow rate. The pressure and/or flow rate of the liquid L supplied into the preform 1 in the blow molding step is higher than the pressure and/or flow rate of the liquid L supplied into the preform 1 in the gas-liquid replacement step. In detail, the pressure and/or flow rate of the liquid L supplied into the preform 1 in the blow molding step is such a pressure and/or flow rate that enables blow molding of the preform 1 by the liquid L. The preform 1 is thus molded into the predetermined shape along the cavity 12 of the mold 11 by blow molding (liquid blow molding) using the liquid L as a pressurized medium in the blow molding step.

In the blow molding step, biaxial stretching blow molding whereby the preform 1 is blow molded by the liquid L after or while stretching the preform 1 in the vertical direction using the stretching rod 22 can be performed.

In the blow molding step, when supplying the liquid L into the preform 1 at the predetermined pressure or flow rate, the liquid L supplied from the blow nozzle 17 into the preform 1 fills the preform 1 without entrapping the air inside the preform 1, because the preform 1 has already been filled with the liquid L as a result of the gas-liquid replacement step. Therefore, in the blow molding step, the preform 1 can be blow molded while suppressing air entrapment into the liquid L. Even in the case where the liquid L is a liquid with relatively high viscosity such as a shampoo, a hair conditioner, or a liquid soap, air entrapment into the liquid L is suppressed. Consequently, bubbling at the liquid surface of the liquid L contained in the molded liquid-containing container C can be prevented, poor appearance caused by air bubbles in the liquid L can be prevented, and a decrease in the apparent specific gravity of the liquid L can be prevented so that the liquid-containing container C can be filled with the prescribed amount of the liquid L.

With this liquid blow molding method, the air inside the preform 1 can be replaced with the liquid L by a simple procedure of, in a state in which the blow nozzle 17 has been descended to the first position at which the mouth part 2 is not sealed, supplying the liquid L into the preform 1 so that the liquid L is supplied into the preform 1 and the air inside the preform 1 is discharged to the outside, with no need to use, as the liquid blow molding device 10, a complex structure including a flow path, an on-off valve, and the like for discharging the air inside the preform 1 to the outside in the main block 14, the stretching rod 22, and the like or perform a complex step of placing the preform 1 filled with the liquid L beforehand in the mold 11. Hence, air entrapment into the liquid in blow molding can be prevented with a simpler structure as the liquid blow molding device 10 and with fewer steps. Such a liquid blow molding method achieves reduction in the manufacturing cost of the liquid-containing container C.

Moreover, with this liquid blow molding method, the air inside the preform 1 can be replaced with the liquid L immediately before the blow molding step. As compared with a method whereby the preform 1 filled with the liquid L beforehand is placed in the mold 11, the preform 1 can be kept from cooling and also the time during which the liquid L is exposed to a heating state can be shortened to enable more accurate blow molding of the preform 1, and degradation of the liquid L contained in the molded liquid-containing container C can be prevented.

Figure 10:
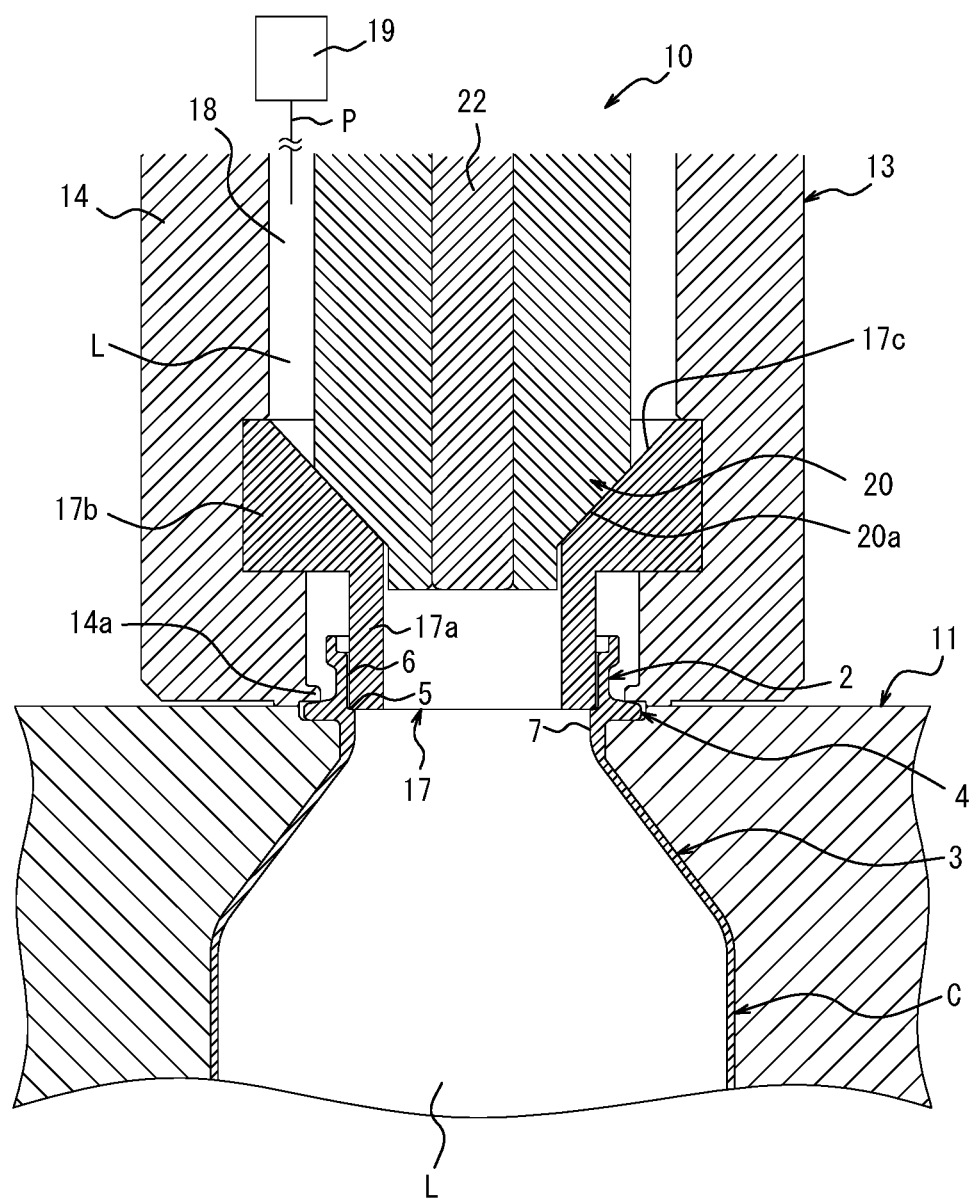
FIG. 10 is an explanatory diagram illustrating the liquid blow molding device in a state in which the blow molding step is completed.

After the blow molding step ends, the preform 1 has been molded into the liquid-containing container C of the predetermined shape containing the liquid L, as illustrated in FIG. 10. After the blow molding step, the nozzle unit 13 is moved upward, and a cap is attached to the mouth part 2 disengaged from the blow nozzle 17. The mold 11 is then opened to take the finished liquid-containing container C out of the mold 11. The cap may be attached to the mouth part 2 of the liquid-containing container C after taking the liquid-containing container C out of the mold 11. After the blow molding step, a suck back step of sucking a predetermined amount of the liquid L from the inside of the molded liquid-containing container C or separation (return to origin) of the stretching rod may be performed to form a headspace not filled with the liquid L in the liquid-containing container C.

Figure 11A:
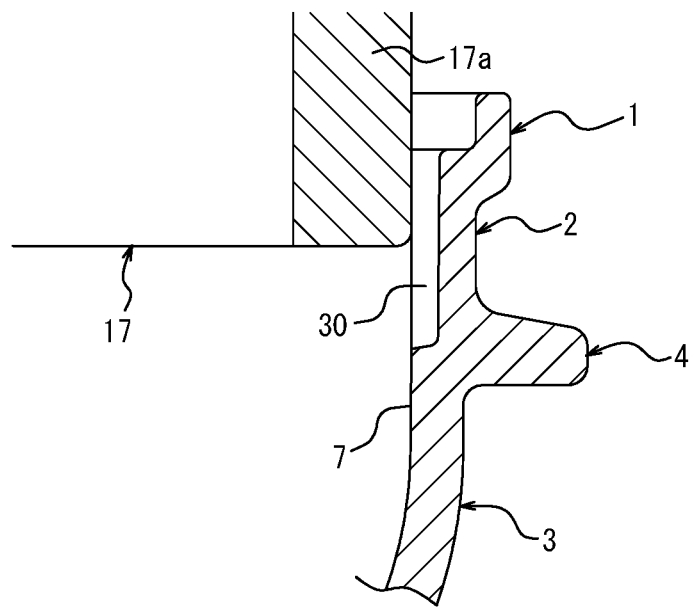
FIG. 11A is a sectional diagram illustrating a modification of the blow nozzle and the preform in a state in which the blow nozzle is at the first position.
Figure 11B:
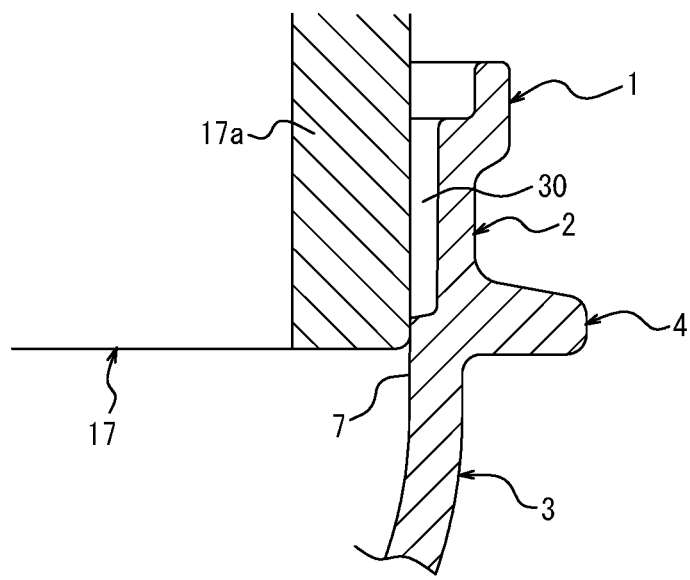
FIG. 11B is a sectional diagram illustrating the modification in a state in which the blow nozzle is at the second position.

FIG. 11A is a sectional diagram illustrating a modification of the blow nozzle 17 and the preform 1 in a state in which the blow nozzle 17 is at the first position. FIG. 11B is a sectional diagram illustrating the modification in a state in which the blow nozzle 17 is at the second position. In FIGS. 11A and 11B, members corresponding to those described above are given the same reference signs.

The preform 1 may have a structure in which an exhaust groove 30 having one end open to the open end of the mouth part 2 and the other end extending toward the body part 3 side with a predetermined length is formed on the inner circumferential surface 7 of the mouth part 2, as illustrated in FIG. 11A. The inner diameter of the inner circumferential surface 7 on which the exhaust groove 30 is formed in the preform 1 is approximately the same as the outer diameter of the nozzle body 17a of the blow nozzle 17. In such a case, when the blow nozzle 17 is descended to the first position, the lower end of the nozzle body 17a of the blow nozzle 17 is located at an intermediate point in the longitudinal direction of the exhaust groove 30, as illustrated in FIG. 11A. Thus, the inside of the preform 1 can communicate with the outside of the preform 1 through the exhaust groove 30.

When the blow nozzle 17 is descended to the second position, the lower end of the nozzle body 17a of the blow nozzle 17 is located lower than the lower end of the exhaust groove 30, as illustrated in FIG. 11B. Thus, the outer circumferential surface of the part of the nozzle body 17a at the lower end can be fitted onto the inner circumferential surface 7 of the preform 1 over the whole circumference, to seal the mouth part 2 of the preform 1 by the blow nozzle 17.

Although the exhaust groove 30 is shaped as a vertical groove along the axial direction of the preform 1 in FIGS. 11A and 11B, the exhaust groove 30 may have any of various shapes as long as one end is open to the open end of the mouth part 2 and the other end extends toward the body part 3 side relative to the open end with the predetermined length. Examples include a groove inclined with respect to the axial direction and a spiral groove.

Alternatively, the same diameter expansion part 6 as that illustrated in FIG. 1 may be provided on the inner circumferential surface 7 of the mouth part 2 instead of the exhaust groove 30, where the lower end of the nozzle body 17a is located at an intermediate point in the axial direction of the diameter expansion part 6 when the blow nozzle 17 is descended to the first position and the lower end of the nozzle body 17a is fitted onto the inner circumferential surface 7 located lower than the diameter expansion part 6 when the blow nozzle 17 is descended to the second position. In this case, the distance over which the nozzle body 17a of the blow nozzle 17 and the inner circumferential surface 7 are in sliding contact with each other is shortened as compared with the case where the exhaust groove 30 is formed on the inner circumferential surface 7 of the mouth part 2, with it being possible to reduce damage on the inner circumferential surface 7 of the mouth part 2.

Figure 12:
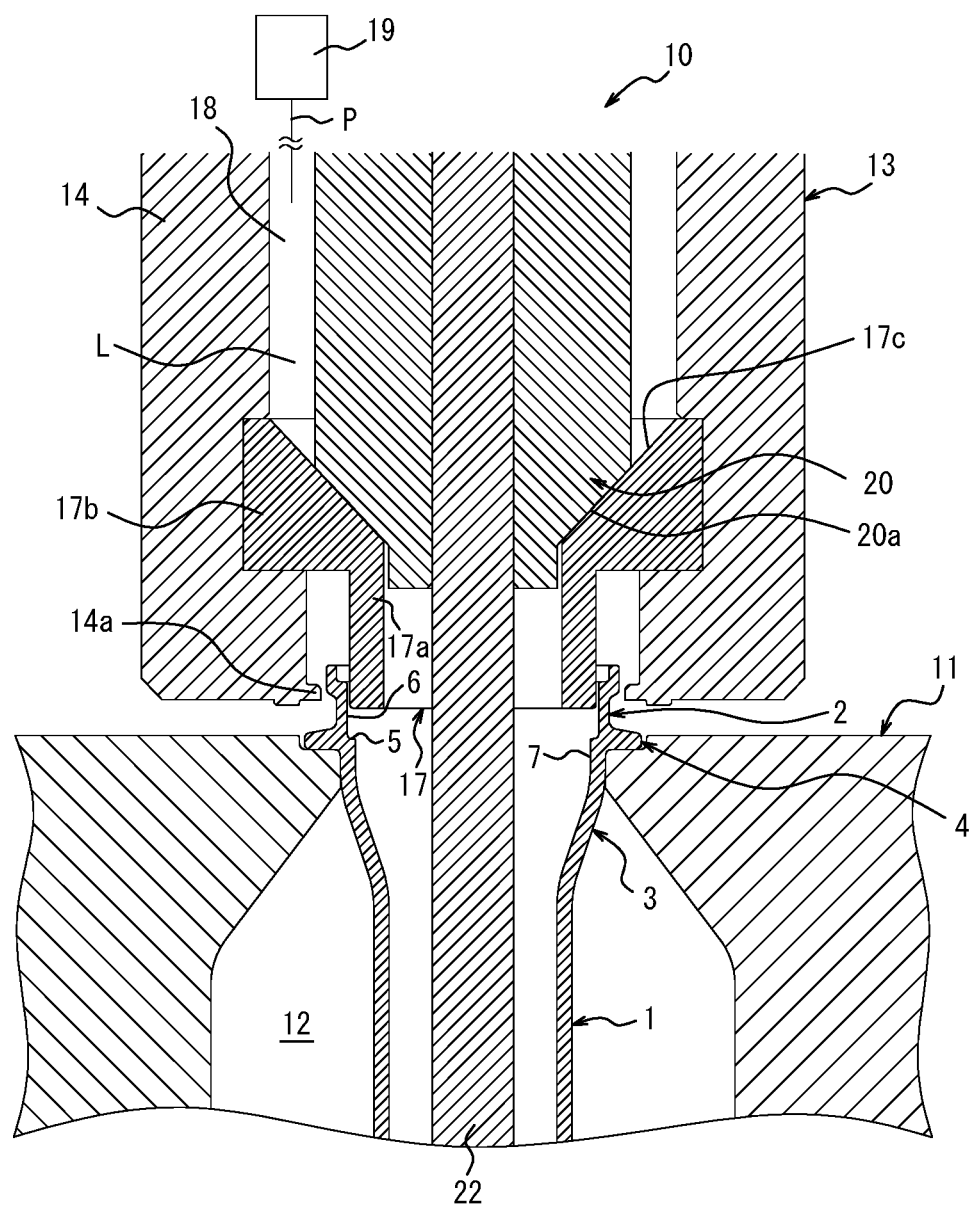
FIG. 12 is an explanatory diagram illustrating the liquid blow molding device in a state in which a rod insertion step is performed before the gas-liquid replacement step.
Figure 13:
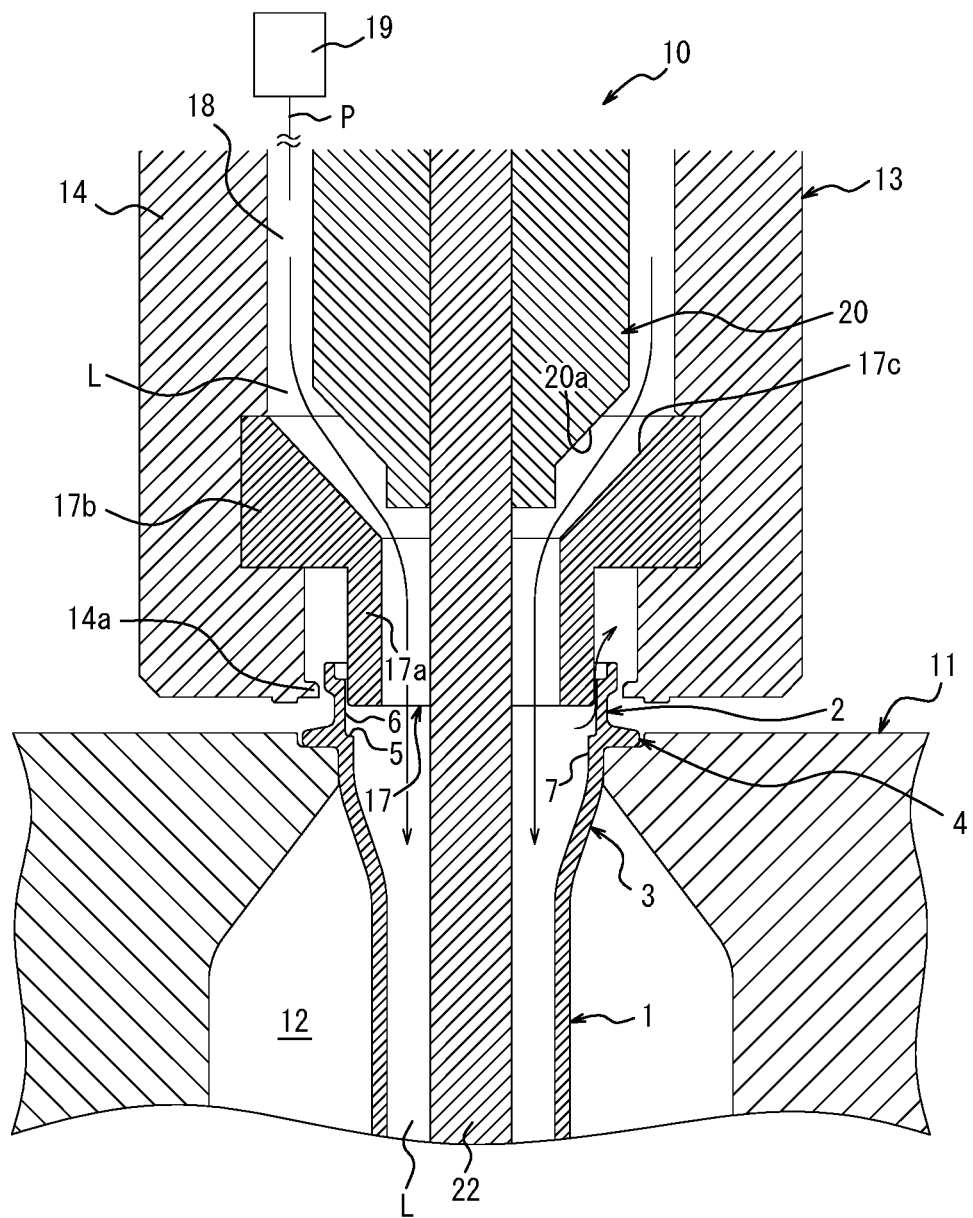
FIG. 13 is an explanatory diagram illustrating the liquid blow molding device in a state in which, after the rod insertion step, the gas-liquid replacement step is performed on the preform having a stretching rod inserted therein.

FIG. 12 is an explanatory diagram illustrating the liquid blow molding device in a state in which a rod insertion step is performed before the gas-liquid replacement step. FIG. 13 is an explanatory diagram illustrating the liquid blow molding device in a state in which, after the rod insertion step, the gas-liquid replacement step is performed on the preform having the stretching rod inserted therein. In FIGS. 12 and 13, members corresponding to those described above are given the same reference signs.

The liquid blow molding method according to this embodiment may include a rod insertion step of inserting a rod member into the preform 1 before the gas-liquid replacement step, wherein the gas-liquid replacement step is performed on the preform 1 having the rod member inserted therein as a result of the rod insertion step.

The rod member inserted into the preform 1 in the rod insertion step may be the stretching rod 22 for stretching the preform 1 in the vertical direction in the blow molding step. FIGS. 12 and 13 illustrate the case where the stretching rod 22 is used as the rod member. For example in the case where the preform 1 is not stretched in the vertical direction by the stretching rod 22 in the blow molding step, a rod member other than the stretching rod 22 may be used as the rod member inserted into the preform 1 in the rod insertion step.

In the rod insertion step after the first nozzle descending step and before the gas-liquid replacement step, the stretching rod 22 is moved downward to be inserted into the preform 1, as illustrated in FIG. 12. Here, the lower end of the stretching rod 22 preferably does not abut on the bottom inner surface of the preform 1, but the lower end of the stretching rod 22 may abut on the bottom inner surface of the preform 1 to such an extent that does not stretch the preform 1. As a result of inserting the stretching rod 22, the capacity of the preform 1, i.e. the capacity for containing the liquid L, decreases by the volume of the part of the stretching rod 22 inserted in the preform 1.

The rod insertion step may be performed by moving the stretching rod 22 downward before the first nozzle descending step and then performing the first nozzle descending step to insert the stretching rod 22 into the preform 1.

Next, the gas-liquid replacement step is performed on the preform 1 having the stretching rod 22 inserted therein, as illustrated in FIG. 13. Since the capacity of the preform 1 has decreased by the volume of the part of the stretching rod 22 inserted in the preform 1, the supply amount of the liquid L necessary for replacing all of the air inside the preform 1 with the liquid L and the time necessary to replace all of the air inside the preform 1 with the liquid L can be reduced as compared with the case where the rod insertion step is not performed.

This reduces the extent to which the preform 1 that has been, before placement in mold 11, preheated to such a predetermined temperature (e.g. 80° C. to 150° C.) at which stretchability is developed is cooled in the gas-liquid replacement step, and enables more accurate blow molding of the preform 1 into the liquid-containing container C in the blow molding step.

In the rod insertion step, the stretching rod 22 is preferably inserted to a position at which the stretching rod 22 occupies 30% to 70% of the capacity of the preform 1. If the stretching rod 22 is inserted only to a position at which the stretching rod 22 occupies less than 30% of the capacity of the preform 1, the supply amount of the liquid L and the time necessary to replace all of the air inside the preform 1 with the liquid cannot be reduced sufficiently, and the foregoing effect is insufficient. If the stretching rod 22 is inserted to a position at which the stretching rod 22 occupies more than 70% of the capacity of the preform 1, for example when stretching the preform 1 by the stretching rod 22, there is a possibility that the stretching rod 22 comes into contact with the inner surface of the preform 1 and damages the preform 1. Besides, if the stretching rod 22 is inserted to a position at which the stretching rod 22 occupies more than 70% of the capacity of the preform 1, the gap between the inner surface of the preform 1 and the outer circumferential surface of the stretching rod 22 is narrow. For example in the case where the liquid L is a liquid with relatively high viscosity such as a shampoo, a hair conditioner, or a liquid soap, there is a possibility that the air inside the preform 1 cannot easily escape to the outside and cannot be replaced with the liquid L sufficiently.

As a result of conducting an experiment using normal-temperature water as the liquid L supplied into the preform 1 in the gas-liquid replacement step, we found out the following: In the case of inserting the stretching rod 22 to a position at which the stretching rod 22 occupied 19% of the capacity of the preform 1, the preform 1 cooled and the foregoing effect was insufficient. In the case of inserting the stretching rod 22 to a position at which the stretching rod 22 occupied 34% of the capacity of the preform 1 and in the case of inserting the stretching rod 22 to a position at which the stretching rod 22 occupied 60% of the capacity of the preform 1, the foregoing effect was sufficient. In the case of inserting the stretching rod 22 to a position at which the stretching rod 22 occupied 70.5% of the capacity of the preform 1, when stretching the preform 1 by the stretching rod, the stretching rod 22 came into contact with the inner surface of the preform 1 and damaged the inner surface of the preform 1 in some cases.

By inserting the stretching rod 22 to a position at which the stretching rod 22 occupies 30% to 70% of the capacity of the preform 1 in the rod insertion step, the air inside the preform 1 can be reliably replaced with the liquid L in the gas-liquid replacement step without damaging the inner surface of the preform 1 and without excessively cooling the preform 1. As a result, the preform 1 can be molded into the liquid-containing container C more accurately in the blow molding step.

Although the stretching rod 22 is stored inside the blow nozzle 17 before the rod insertion step and, from this state, the stretching rod 22 is moved downward to insert the stretching rod 22 into the preform 1 in FIGS. 12 and 13, this is not a limitation. The length of the stretching rod 22 may be such that the stretching rod 22 projects downward from the blow nozzle 17 already in its original position (i.e. before the first nozzle descending step), where the part of the stretching rod 22 projecting downward from the blow nozzle 17 is inserted into the preform 1 as a result of the first nozzle descending step. In this case, the proportion in which the stretching rod 22 occupies the capacity of the preform 1 may be changed as appropriate by, for example, shaping the part of the stretching rod 22 projecting downward from the blow nozzle 17 to be larger in diameter than the part of the stretching rod 22 above the downward projecting part.

The present disclosure is not limited to the foregoing embodiments, and various changes can be made without departing from the scope of the present disclosure.

For example, although the foregoing embodiments describe the case where the liquid blow molding method according to the present disclosure is carried out using the liquid blow molding device 10 of the structure illustrated in FIG. 3, the liquid blow molding method according to the present disclosure may be carried out using a liquid blow molding device of another structure.

Although the foregoing embodiments describe the case where the liquid blow molding device 10 liquid blow molds the preform 1 illustrated in FIG. 1 or FIGS. 11A and 11B, the preform 1 is not limited to the shapes described above, and may have any of various shapes depending on the shape of the molded container and the like as long as it is a bottomed cylindrical preform having a mouth part.

Although the foregoing embodiments describe the case where the nozzle body 17*a* of the blow nozzle 17 is descended to the first position so that the nozzle body 17*a* of the blow nozzle 17 is inserted into the mouth part 2 while forming a gap with the mouth part 2, this is not a limitation. The nozzle body 17*a* of the blow nozzle 17 may be descended to the first position so that the lower end of the nozzle body 17*a* of the blow nozzle 17 is located above the open end of the mouth part 2 to form a gap between the mouth part 2 and the blow nozzle 17. In this case, when the blow nozzle 17 is descended to the second position, the lower end of the nozzle body 17*a* may abut on the open end of the mouth part 2 in the axial direction to seal the mouth part 2, the nozzle body 17*a* may be fitted into the mouth part 2 to seal the mouth part 2, or the lower end of the nozzle body 17*a* may be fitted into the mouth part 2 while causing a flange part of the nozzle body 17*a* to abut on the open end of the mouth part 2 in the axial direction to seal the mouth part 2.

In the gas-liquid replacement step and/or the blow molding step, the supply of the liquid L into the preform 1 may be maintained while gradually increasing the pressure and/or the flow rate.

REFERENCE SIGNS LIST

1 preform
2 mouth part 3 body part
4 neck support part
5 step surface
6 diameter expansion part
7 inner circumferential surface
10 liquid blow molding device
11 mold
12 cavity
13 nozzle unit
14 main block
14a hook part
17 blow nozzle
17a nozzle body
17b sandwiched part
17c closed surface
18 supply path
19 pressurized liquid supply part
20 seal body
20a tapered surface
22 stretching rod (rod member)
30 exhaust groove
C liquid-containing container
P piping

The invention claimed is:

1. A liquid blow molding method of molding a bottomed cylindrical preform having a mouth part into a liquid-containing container of a predetermined shape, the liquid blow molding method comprising:
   a first nozzle descending step of descending a blow nozzle to a first position at which the blow nozzle does not seal the mouth part;
   a gas-liquid replacement step of supplying a liquid into the preform from the blow nozzle at the first position and discharging air inside the preform to outside through a gap between the mouth part and the blow nozzle;
   a second nozzle descending step of descending the blow nozzle to a second position at which the blow nozzle seals the mouth part, after the gas-liquid replacement step; and
   a blow molding step of supplying the liquid into the preform from the blow nozzle at the second position to blow mold the preform into the predetermined shape.

2. The liquid blow molding method according to claim 1, wherein at least one of a pressure and a flow rate of the liquid supplied into the preform is lower in the gas-liquid replacement step than in the blow molding step.

3. The liquid blow molding method according to claim 1, wherein the preform has a diameter expansion part, on an inner circumferential surface of the mouth part, extending from an open end of the mouth part in an axial direction and having a larger diameter than an outer diameter of the blow nozzle, and a step surface extending radially inward from a lower end of the diameter expansion part,
   the first position is a position at which a lower end of the blow nozzle has a gap in the axial direction with the step surface, and
   the second position is a position at which the lower end of the blow nozzle abuts on the step surface over a whole circumference.

4. The liquid blow molding method according to claim 1, comprising
   a rod insertion step of inserting a rod member into the preform, before the gas-liquid replacement step,
   wherein the gas-liquid replacement step is performed on the preform having the rod member inserted therein as a result of the rod insertion step.

5. The liquid blow molding method according to claim 4, wherein in the rod insertion step, the rod member is inserted to a position at which the rod member occupies 30% to 70% of a capacity of the preform.

6. The liquid blow molding method according to claim 4, wherein the rod member is a stretching rod for stretching the preform in an axial direction.

7. The liquid blow molding method according to claim 1, wherein an opening of a seal body that opens and closes the blow nozzle is adjusted so that an effective cross-sectional area of the blow nozzle when supplying the liquid into the preform in the gas-liquid replacement step is not more than 10% of an effective cross-sectional area of the blow nozzle when supplying the liquid into the preform in the blow molding step.

* * * * *